(12) United States Patent
Wang et al.

(10) Patent No.: US 11,321,886 B2
(45) Date of Patent: May 3, 2022

(54) APPARATUS AND ASSOCIATED METHODS

(71) Applicant: NOKIA TECHNOLOGIES OY, Espoo (FI)

(72) Inventors: Tinghuai Wang, Tampere (FI); Lixin Fan, Tampere (FI); Yu You, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/325,771

(22) PCT Filed: Aug. 15, 2017

(86) PCT No.: PCT/FI2017/050574
§ 371 (c)(1),
(2) Date: Feb. 15, 2019

(87) PCT Pub. No.: WO2018/033662
PCT Pub. Date: Feb. 22, 2018

(65) Prior Publication Data
US 2019/0213769 A1    Jul. 11, 2019

(30) Foreign Application Priority Data

Aug. 19, 2016  (EP) .................................... 16184827

(51) Int. Cl.
*G06T 11/60* (2006.01)
*G06Q 10/10* (2012.01)
(Continued)

(52) U.S. Cl.
CPC ............ *G06T 11/60* (2013.01); *G06F 40/137* (2020.01); *G06F 40/169* (2020.01);
(Continued)

(58) Field of Classification Search
CPC ....... G06T 11/60; G06F 40/169; G06F 40/295
See application file for complete search history.

(56) References Cited

U.S. PATENT DOCUMENTS

| 6,784,901 B1 | 8/2004 | Harvey et al. |
| 8,732,591 B1 | 5/2014 | Mendes et al. |
| (Continued) | | |

FOREIGN PATENT DOCUMENTS

| CN | 104504063 A | 4/2015 |
| EP | 3 264 783 A1 | 1/2018 |
| (Continued) | | |

OTHER PUBLICATIONS

International Search Report and Written Opinion for Application No. PCT/FI2017/050574 dated Oct. 6, 2017, 11 pages.
(Continued)

*Primary Examiner* — Ryan R Yang
(74) *Attorney, Agent, or Firm* — Alston & Bird LLP

(57) ABSTRACT

An apparatus configured to, in respect of virtual reality content comprising video imagery configured to provide a virtual reality space wherein a virtual reality view presented to a user provides for viewing of the VR space; based on a comment made by and a virtual location of a commenting-user in the virtual reality space when the comment was made; provide for determination of a point of interest in the virtual reality space, the point of interest identified based on, at least, the virtual location of the commenting-user when the comment was made and semantic analysis of the comment to identify the point of interest surrounding the virtual location to which the comment refers, the point of interest associated with the comment thereby enabling the comment to be overlaid over the virtual reality view of the video imagery.

20 Claims, 3 Drawing Sheets

(51) Int. Cl.
*G06F 40/30* (2020.01)
*G06F 40/137* (2020.01)
*G06F 40/169* (2020.01)
*G06F 40/295* (2020.01)
*H04N 13/183* (2018.01)

(52) U.S. Cl.
CPC ............ *G06F 40/295* (2020.01); *G06F 40/30* (2020.01); *G06Q 10/10* (2013.01); *H04N 13/183* (2018.05)

(56) References Cited

U.S. PATENT DOCUMENTS

| | | | |
|---|---|---|---|
| 8,898,316 B2 | 11/2014 | Facemire et al. | |
| 9,189,818 B2 * | 11/2015 | McClements, IV | G11B 27/034 |
| 2006/0061595 A1 * | 3/2006 | Goede | G06F 16/58 345/619 |
| 2008/0243370 A1 * | 10/2008 | Loera | G01C 21/36 701/533 |
| 2009/0179895 A1 * | 7/2009 | Zhu | G06T 11/60 345/424 |
| 2013/0178257 A1 | 7/2013 | Langseth | |
| 2013/0311868 A1 * | 11/2013 | Monney | G06F 16/70 715/230 |
| 2014/0181630 A1 * | 6/2014 | Monney | G06K 9/209 715/232 |
| 2014/0304122 A1 * | 10/2014 | Rhoads | G06T 19/006 705/27.2 |
| 2015/0262428 A1 | 9/2015 | Tatzgern et al. | |
| 2016/0265935 A1 * | 9/2016 | Ma | G01C 21/3697 |
| 2016/0328883 A1 * | 11/2016 | Parfenov | G06F 9/453 |
| 2016/0366466 A1 | 12/2016 | Shen et al. | |
| 2017/0199855 A1 * | 7/2017 | Fish | G06F 3/04842 |
| 2017/0308589 A1 * | 10/2017 | Liu | G06F 16/9535 |
| 2018/0137681 A1 * | 5/2018 | Chang | G06F 3/0482 |
| 2018/0181811 A1 * | 6/2018 | Yakishyn | G06K 9/00597 |
| 2020/0175274 A1 * | 6/2020 | Laaksonen | G06T 7/74 |

FOREIGN PATENT DOCUMENTS

| | | | |
|---|---|---|---|
| WO | WO 2008083978 | * | 7/2008 |
| WO | WO 2014/135427 A1 | | 9/2014 |
| WO | WO 2016/004859 A1 | | 1/2016 |

OTHER PUBLICATIONS

Engestrom, U., *Interactive 360 Degree Videos: A Demo for a New User Interface*, [online][retrieved Mar. 19, 2019]. Retrieved from the Internet: <https://blog.thinglink.com/marketing/interactive-360-degree-video>, (dated Oct. 9, 2015) 11 pages.

Engestrom, U., *ThingLink Launches 360/VR Editor to Embed Multimedia Content in Panoramic Virtual Reality Images* [online] [retrieved Mar. 19, 2019]. Retrieved from the Internet: <https://blog.thinglink.com/marketing/thinglink-launches-360/vr-editor-to-embed-multimedia-content-in-panoramic-virtual-reality-images>. (dated Apr. 29, 2016) 11 pages.

CPU's Teacher Interacts With Students With Bullet Screen in Class [online] [retrieved Jun. 26, 2016]. Retrieved from the Internet: <http://english.eqnews.net/html/2016-05/26/content_37021483.htm>. (May 26, 2016) 2 pages.

Extended European Search Report for Application No. 16184827.0 dated Jan. 5, 2017, 8 pages.

Office Action for European Application No. 16184827.0 dated Oct. 8, 2018, 8 pages.

Summons to Attend Oral Proceedings for European Application No. 16184827.0 dated Mar. 15, 2019, 11 pages.

Result of Consultation for European Application No. 16184827.0 dated Sep. 13, 2019, 9 pages.

Decision to Refuse for European Application No. 16184827.0 dated Oct. 9, 2019, 29 pages.

* cited by examiner

| Comment ID | x | y | z | xd | yd | zd | Comment |
|---|---|---|---|---|---|---|---|
| 1 | X1 | Y1 | Z1 | Xd1 | Yd1 | Zd1 | The clock and dials were designed by Augustus Pugin |
| 2 | X2 | Y2 | Z2 | Xd2 | Yd2 | Zd2 | Big Ben is taller than I thought |
| 3 | X3 | Y3 | Z3 | Xd3 | Yd3 | Zd3 | Big Ben was built in 1859 |
| 4 | X4 | Y4 | Z4 | Xd4 | Yd4 | Zd4 | Houses of Parliament are by the river Thames |
| 5 | X5 | Y5 | Z5 | xd5 | yd5 | Zd5 | Houses of Parliament are really gorgeous |

Figure 5

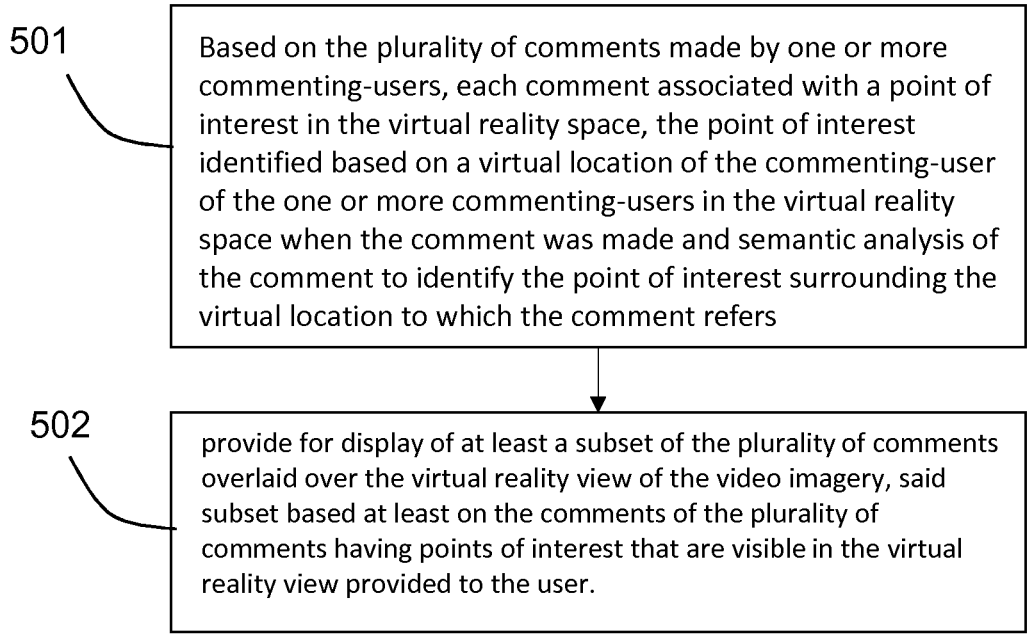

501 — Based on the plurality of comments made by one or more commenting-users, each comment associated with a point of interest in the virtual reality space, the point of interest identified based on a virtual location of the commenting-user of the one or more commenting-users in the virtual reality space when the comment was made and semantic analysis of the comment to identify the point of interest surrounding the virtual location to which the comment refers 502 — provide for display of at least a subset of the plurality of comments overlaid over the virtual reality view of the video imagery, said subset based at least on the comments of the plurality of comments having points of interest that are visible in the virtual reality view provided to the user.

Figure 6

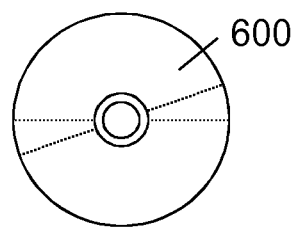

600

APPARATUS AND ASSOCIATED METHODS

CROSS-REFERENCE TO RELATED APPLICATIONS

The present application is a national phase entry of International Application No. PCT/FI2017/050574, filed Aug. 15, 2017, which claims priority to EP Application No. 16184827.0, filed Aug. 19, 2016, all of which are incorporated herein by reference in their entirety.

TECHNICAL FIELD

The present disclosure relates to the field of virtual reality and, in particular, to the display of comments relating to an object of interest. Associated methods, computer programs and apparatus is also disclosed. Certain disclosed aspects/examples relate to portable electronic devices.

BACKGROUND

While watching virtual reality content a user may wish to comment on the things they see. It may be desirable to present those comments to a user watching the same virtual reality content.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
   at least one processor; and
   at least one memory including computer program code,
   the at least one memory and the computer program code configured to, with the at least one processor, cause the apparatus to perform at least the following:
   in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;
   based on the plurality of comments made by one or more commenting-users, each comment associated with a point of interest in the virtual reality space, the point of interest identified based on a virtual location of the commenting-user of the one or more commenting-users in the virtual reality space when the comment was made and semantic analysis of the comment to identify the point of interest surrounding the virtual location to which the comment refers;
   provide for display of at least a subset of the plurality of comments overlaid over the virtual reality view of the video imagery, said subset based at least on the comments of the plurality of comments having points of interest that are visible in the virtual reality view provided to the user.

In one or more examples, a commenting-user may make a comment about a point of interest that features in the virtual reality view they see created from the virtual reality content. Semantic analysis of the comment may provide for identification of a virtual location that is the subject of that comment (i.e. the "point of interest" referenced in the comment), which may be a point surrounding the virtual location the commenting-user was at when the comment was made. When the virtual reality content is watched by a user following the making of the comment, the comment may be provided for display associated with the point of interest in the virtual reality view of the user. The user may be a different user watching the same virtual reality content at the same or later time. The comments may comprise one or more of; information about the point of interest, opinion of the commenting user, a link to further information about the point of interest, a link to further virtual reality content that includes the point of interest.

In one or more embodiments, each of the comments of said subset of the plurality of comments overlaid over the virtual reality view of the video imagery are positioned in the virtual reality view such that they are associated with the point of interest to which they relate as it appears in the video imagery.

In one or more examples, each comment of the subset of comments may be provided for display such that they are one or more of;
   i) positioned within a predetermined distance of the position at which the point of interest is visible in the video imagery;
   ii) positioned to appear as if floating above the position at which the point of interest is visible in the video imagery;
   iii) provided for display with a connecting-line graphic that at least points towards the position at which the point of interest is visible in the video imagery.

In one or more embodiments, each comment is further associated with a viewing direction comprising the viewing direction of the commenting-user in the virtual reality space when they made the comment, and wherein
   said subset is based on one or more comments of the plurality of comments having points of interest that are visible in the virtual reality view provided to the user and wherein a viewing direction of the virtual reality view provided to the user is within a viewing-direction threshold of the viewing direction associated with the comment.

In one or more embodiments, said subset is further based on a virtual distance in the virtual reality space between a point of view of the virtual reality view provided to the user and the point of interest of each of the plurality of comments.

In one or more examples, the virtual distance may be used to limit the number of comments provided for display despite the comments of the plurality of comments having points of interest that are visible in the virtual reality view provided to the user. In one or more examples, the comments are categorized based on one or more of; generality of the subject matter of the comment, popularity of the comment with other users, sentiment of the comment and the apparatus is configured to include different categories of comment in the subset based on the virtual distance.

In one or more embodiments, said subset is further based on;
   a virtual distance in the virtual reality space between a point of view of the virtual reality view provided to the user and the point of interest of each of the plurality of comments and a size of the point of interest in the virtual reality space.

In one or more embodiments, the size of the point of interest may be determined based on one or more of predetermined map data and image recognition of the point of interest.

In one or more embodiments, the comments of the plurality of comments that relate to the same point of interest are each associated with one of at least two categories based on semantic analysis of the comment, a first of the at least two categories associated with comments that relate to the point of interest in general terms and a second of the at least two categories associated with comments that relate to one or more of; (i) a sub-region of a region occupied by the point of interest and (ii) a characteristic of a part of the point of interest, and wherein;

the subset of comments is further based on the category.

In one or more embodiments, said subset is further based on a virtual distance in the virtual reality space between a point of view of the virtual reality view provided to the user and the point of interest of each of the plurality of comments wherein comments of the first of the at least two categories and not the second are included in the subset when the virtual distance is above a threshold amount and comments of the second of the at least two categories are included in the subset when the virtual distance is below the threshold amount.

In one or more examples, when the virtual distance is below the threshold amount comments of the first category may be excluded from the subset. Thus, in one or more examples, more specific comments, determined by way of the categories, may be provided for display as the virtual distance between the point of view of the user's virtual reality view and the point of interest reduces. In one or more examples less specific comments, determined by way of the categories, may be removed from display as the virtual distance between the point of view of the user's virtual reality view and the point of interest decreases. It will be appreciated that in one or more embodiments, as the virtual distance increases, more specific comments may be removed from display and/or less specific comments may be provided for display, as part of the subset.

In one or more embodiments, each comment is associated with a comment-spatial-range, the comment-spatial-range defining a virtual spatial region in the virtual reality space associated with the point of interest, and wherein one or more of the size and shape of the comment-spatial-range is based on semantic analysis of the comment, and wherein the inclusion in the subset of each comment of the plurality of comments is based on a correlation between the location of the point of view of the virtual reality view provided to the user and the comment-spatial-range.

In one or more embodiments, the comment-spatial-range defines an area in the virtual reality space from which a feature of the point of interest mentioned in the comment is visible and within a particular threshold distance.

In one or more embodiments, the point of interest is identified based on one or more of;

i) reference to predetermined point of interest data comprising a database of names of points of interest and their associated location indicative of the location in the video imagery where point of interest appears, such that one or more words in the comment determined by semantic analysis correlate with the names in the predetermined point of interest data; and ii) semantic analysis of the comment to identify a point of interest at a location that is expressed as relative to the virtual location of the commenting-user.

In one or more examples, the point of interest may comprise one or more of an object, person or location and may be identified by semantic analysis of the comment. The predetermined point of interest data may include one or more of: a list of points of interest, a list of objects, and a list of people that appear in a scene or geographic area visible in the virtual reality content. The predetermined point of interest data may therefore include a location for each point of interest, such that the comment can be included/not included in the subset provided for display, as appropriate. The location specified in the predetermined point of interest data may be fixed or time variant. For example, if the point of interest is a famous singer, who is moving around on a stage, the location of the point of interest will change over time. Thus, the point of interest may be, even with a stationary point of view of the virtual reality view, move within or outside the virtual reality view presented to the user and, accordingly, comments relating to that point of interest may be include or excluded from the subset.

In a second aspect there is provided an apparatus comprising:

at least one processor; and at least one memory including computer program code, the at least one memory and the computer program code configured to, with the at least one processor, cause the apparatus to perform at least the following:

in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on a comment made by a commenting-user and a virtual location of the commenting-user in the virtual reality space when the comment was made;

provide for determination of a point of interest in the virtual reality space, the point of interest identified based on, at least, the virtual location of the commenting-user when the comment was made and semantic analysis of the comment to identify the point of interest surrounding the virtual location to which the comment refers, the point of interest associated with the comment thereby enabling the comment to be overlaid over the virtual reality view of the video imagery based on the point of interest associated with the comment being visible in the virtual reality view provided to a user.

In one or more embodiments, the determination of the point of interest is further based on a view direction of the commenting-user when the comment was made.

In a third aspect there is provided a method, the method comprising, in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on the plurality of comments made by one or more commenting-users, each comment associated with a point of interest in the virtual reality space, the point of interest identified based on a virtual location of the commenting-user of the one or more commenting-users in the virtual reality space when the comment was made and semantic analysis of the comment to identify the point of interest surrounding the virtual location to which the comment refers;

providing for display of at least a subset of the plurality of comments overlaid over the virtual reality view of the video imagery, said subset based at least on the comments of the plurality of comments having points of interest that are visible in the virtual reality view provided to the user.

In a fourth aspect there is provided a method, the method comprising, in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on a comment made by a commenting-user and a virtual location of the commenting-user in the virtual reality space when the comment was made;

provide for determination of a point of interest in the virtual reality space, the point of interest identified based on, at least, the virtual location of the commenting-user when the comment was made and semantic analysis of the comment to identify the point of interest surrounding the virtual location to which the comment refers, the point of interest associated with the comment thereby enabling the comment to be overlaid over the virtual reality view of the video imagery based on the point of interest associated with the comment being visible in the virtual reality view provided to a user.

In a further aspect there is provided a computer readable medium comprising computer program code stored thereon, the computer readable medium and computer program code being configured to, when run on at least one processor, perform the method of in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on the plurality of comments made by one or more commenting-users, each comment associated with a point of interest in the virtual reality space, the point of interest identified based on a virtual location of the commenting-user of the one or more commenting-users in the virtual reality space when the comment was made and semantic analysis of the comment to identify the point of interest surrounding the virtual location to which the comment refers;

providing for display of at least a subset of the plurality of comments overlaid over the virtual reality view of the video imagery, said subset based at least on the comments of the plurality of comments having points of interest that are visible in the virtual reality view provided to the user.

In a further aspect there is provided a computer readable medium comprising computer program code stored thereon, the computer readable medium and computer program code being configured to, when run on at least one processor, perform the method of in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on a comment made by a commenting-user and a virtual location of the commenting-user in the virtual reality space when the comment was made;

provide for determination of a point of interest in the virtual reality space, the point of interest identified based on, at least, the virtual location of the commenting-user when the comment was made and semantic analysis of the comment to identify the point of interest surrounding the virtual location to which the comment refers, the point of interest associated with the comment thereby enabling the comment to be overlaid over the virtual reality view of the video imagery based on the point of interest associated with the comment being visible in the virtual reality view provided to a user.

In a further aspect there is provided an apparatus, the apparatus comprising means configured to;

in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on the plurality of comments made by one or more commenting-users, each comment associated with a point of interest in the virtual reality space, the point of interest identified based on a virtual location of the commenting-user of the one or more commenting-users in the virtual reality space when the comment was made and semantic analysis of the comment to identify the point of interest surrounding the virtual location to which the comment refers;

provide for display of at least a subset of the plurality of comments overlaid over the virtual reality view of the video imagery, said subset based at least on the comments of the plurality of comments having points of interest that are visible in the virtual reality view provided to the user.

In a further aspect there is provided an apparatus, the apparatus comprising means configured to;

in respect of virtual reality content comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on a comment made by a commenting-user and a virtual location of the commenting-user in the virtual reality space when the comment was made;

provide for determination of a point of interest in the virtual reality space, the point of interest identified based on, at least, the virtual location of the commenting-user when the comment was made and semantic analysis of the comment to identify the point of interest surrounding the virtual location to which the comment refers, the point of interest associated with the comment thereby enabling the comment to be overlaid over the virtual reality view of the video imagery based on the point of interest associated with the comment being visible in the virtual reality view provided to a user.

The present disclosure includes one or more corresponding aspects, examples or features in isolation or in various combinations whether or not specifically stated (including claimed) in that combination or in isolation. Corresponding means and corresponding functional units (e.g., function enabler, point of view determiner, display device, viewing direction determiner, semantic analyser, comment filter) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 5 shows a flowchart illustrating an example method; and

FIG. 6 shows a computer readable medium.

DESCRIPTION OF EXAMPLE ASPECTS

Virtual reality (VR) may use a headset, such as glasses or goggles, or one or more displays that surround a user to provide a user with an immersive virtual experience. A virtual reality apparatus may present multimedia virtual reality content representative of a virtual reality space to a user to simulate the user being present within the virtual reality space. The virtual reality space may replicate a real world environment to simulate the user being physically present at a real world location or the virtual reality space may be computer generated or a combination of computer generated and real world multimedia content. The virtual reality space may be provided by a panoramic video, such as a video having a wide or 360° field of view (which may include above and/or below a horizontally oriented field of view). The virtual reality space may thus provide a virtual 3-dimensional environment in which the video imagery of the VR content is provided for display. A user may be provided with a spatial subset of the virtual reality space as their VR view, i.e. a view port to view the video imagery of the VR space. The virtual reality apparatus may provide for user interaction with the virtual reality space displayed. The virtual reality content provided to the user may comprise live or recorded images of the real world, captured by a virtual reality content capture device such as a panoramic video capture device or other virtual reality content capture device, for example. One example of a virtual reality content capture device is a Nokia OZO camera. The virtual reality space may provide a 360° or more field of view and may provide for panning/rotating around said field of view based on movement of the VR user's head or eyes. The virtual reality view of a virtual reality space may be provided to said user by the virtual reality apparatus via displays in the headset. The virtual reality space may appear to the user of the VR apparatus as a three dimensional space created from (e.g. video) images of the virtual reality content. Thus, the VR content may comprise images taken in multiple viewing directions that can be displayed and arranged together to form a (e.g. uninterrupted, continuous) wrap around field of view.

While watching virtual reality content a user (termed a commenting-user) may wish to make a comment about an object, a person or people or an event that they see in the virtual reality content. The object, people or event may collectively be termed a point of interest in the virtual reality content. In some examples, one or more commenting-users may each make one or more comments about things they see in the VR content.

When a user views the same VR content it may be desirable to provide for display of the comments of the commenting-user(s). However, given that the user can view the points of interest from many different points of view and/or viewing angles, effective display of comments may be beneficial.

Figure 1:
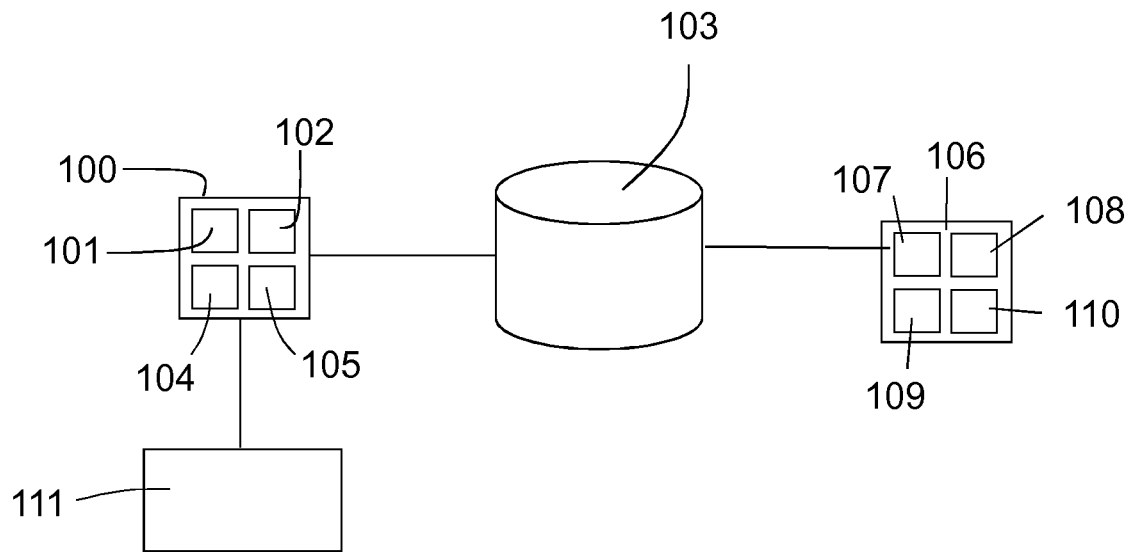
FIG. 1 illustrates an apparatus for providing for display of comments in virtual reality.

With reference to FIG. 1, in one or more embodiments the apparatus 100 is configured to provide for display of a subset of comments about points of interest in the virtual reality content, the subset selected based on points of interest that are currently visible to a user in their virtual reality view and wherein the points of interest are identified from semantic analysis of the comments and at least the virtual location of the commenting-user who made the comment. In one or more embodiments, an apparatus 106 is disclosed that is configured to determine a point of interest referenced in a comment, the point of interest identified from semantic analysis of the comments and at least the virtual location of the commenting-user who made the comment. The point of interest identified by the apparatus 106 may then be provided to the apparatus 100, such as with data representing the comments, so that the apparatus 100 can display the comments as required.

In this embodiment the apparatus 100 and/or apparatus 106 mentioned above may have only one processor 101, 107 and one memory 102, 108 but it will be appreciated that other embodiments may utilise more than one processor and/or more than one memory (e.g. same or different processor/memory types). Further, the apparatus 100, 106 may be an Application Specific Integrated Circuit (ASIC). It will be appreciated that the apparatus 100 and 106 are, in terms of their hardware configuration, independent of one another.

In this embodiment the apparatus 100 and/or apparatus 106 includes an input 104, 109 and an output 105, 110 for receipt of signalling and provision of output signalling.

The processor may be a general purpose processor dedicated to executing/processing information received from other components, such as from content store 103 and the respective apparatuses 101, 106 in accordance with instructions stored in the form of computer program code in the memory. The content store 103 may represent local storage of the apparatus 100 or the apparatus 106 or may represent storage connected to via a network, such as the Internet. The content store 103 may provide the VR content to the apparatus 100 and/or apparatus 106.

The input 104 may be for receipt of signalling indicative of the VR view of VR content provided to a user by the VR apparatus 111 and the receipt of comments associated with the VR content. The input 109 may be for receipt of signalling indicative of comments of the commenting-user and a virtual location of the commenting-user. The output signalling generated by such operations of the processor is provided onwards to further components. For example, the apparatus 100 may provide signalling, by output 105, to the VR apparatus 111 for display of a subset of comments to a user. For example, the apparatus 106 may provide signalling, by output 110, to the content store 103 to specify points of interest identified from comments made by commenting-users.

The memory 102, 108 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

While FIG. 1 shows the apparatus 100 and apparatus 106 connected together via the content store 103, this may be for understanding only. The apparatus 106 may be configured to determine points of interest from comments received from one or more commenting-users and associate that information with the VR content. The apparatus 100, which may comprise the user's or commenting-user's, may access the same VR content (or a copy thereof) and provide the comments for inclusion in the VR content and/or receive comments for display, along with the point of interest information, as part of the display of the VR content.

Figure 2:
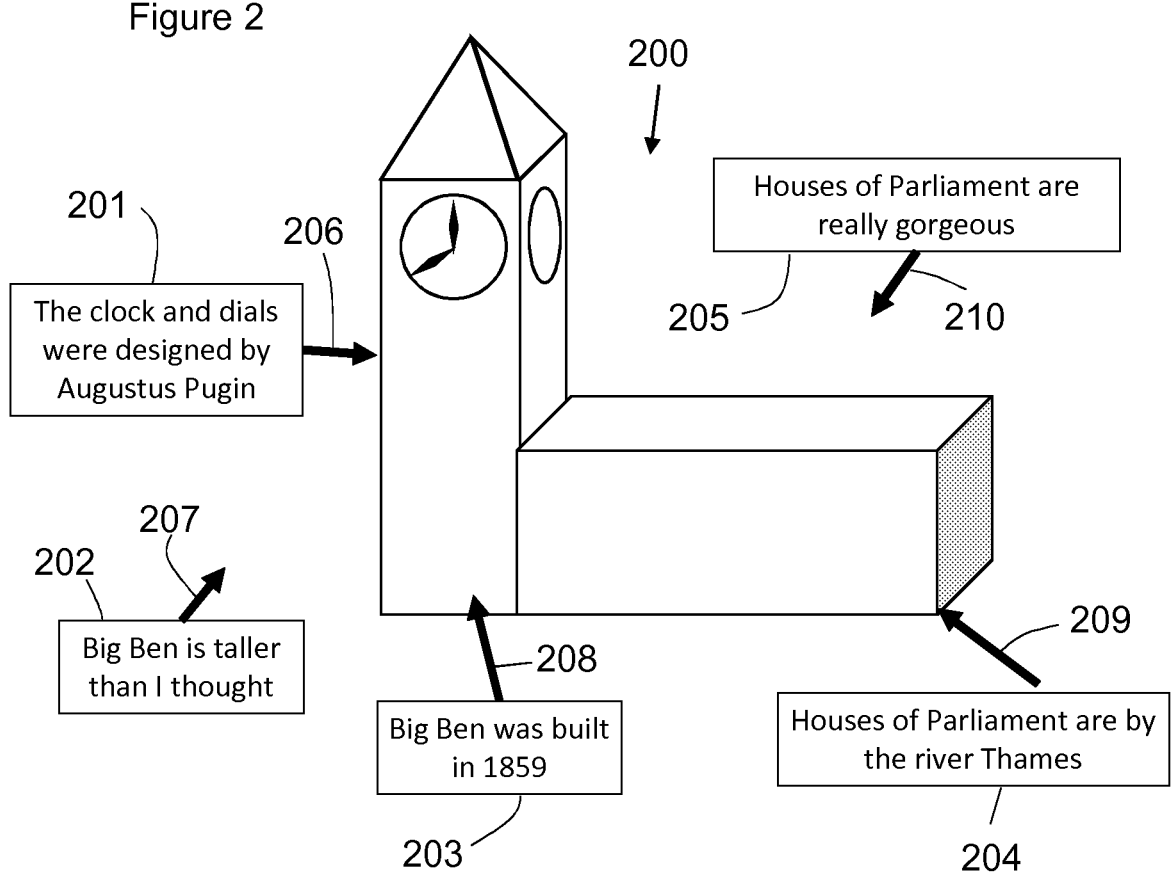
FIG. 2 illustrates a point of interest and a plurality of comments about the point of interest left by one or more commenting-users.

FIG. 2 shows a view of virtual reality content comprising video imagery. The video imagery is provided for display such that it "wraps around" the user creating a virtual reality space that the user can look around using the VR apparatus 111. The virtual reality space may thus represents a virtual three-dimensional environment in which the video imagery of the virtual reality content is displayed. In some examples, the point of view, i.e. the virtual location in the virtual reality space from which the user views the VR content is fixed and the user may only change their viewing direction such that they are presented with a virtual reality view with a corresponding change in viewing direction. In one or more examples, VR content may be captured from multiple points of view, which may enable the user to change the point of view in the virtual reality space as well as the viewing direction.

In FIG. 2, the Palace of Westminster also known as the Houses of Parliament 200 in London, UK happen to be featured in the virtual reality content. On watching the VR content a user may wish to comment about what they see. In one or more examples, a VR content producer may wish to supplement the VR content with extra information, which may take the form of a comment. The term comment may include text or multimedia. FIG. 2 shows a plurality of comments 201-205. The way the comments are shown in FIG. 2 may not represent how the comments are shown to a user, but may be for the purpose of illustrating properties of comments made by one or more commenting-users. Each comment 201-205 may include metadata that specifies the virtual location in the virtual reality space the commenting-user was at when the comment was made. Thus, the position of the comment as shown in FIG. 2 may represent this virtual location. It will be appreciated that other means for associating the virtual location with the comment, other than metadata, may be used. Each comment may also be associated with one or more of (i) a viewing direction comprising the viewing direction in the virtual reality space the commenting-user had when the comment was made and (ii) a viewing time comprising a time relative to the VR content at which the commenting-user made the comment. In one or more examples, the virtual location and viewing direction and/or viewing time may be used to determine under what conditions to display the comment to a further user. FIG. 2 shows the viewing direction by way of arrows 206-210.

The subject of the first comment 201, "The clock and dials were designed by Augustus Pugin", is the clocks and dials at the top of the Elizabeth tower, also known as "Big Ben". The subject of the second comment 202, "Big Ben is taller than I thought", is to the Elizabeth tower more generally. The subject of the third comment 203, "Big Ben was built in 1859", also refers to the Elizabeth tower more generally but from a different point of view and viewing direction 208 to the second comment 202. The subject of the fourth comment 204, "Houses of Parliament are by the river Thames", is to the Houses of Parliament as a whole or to buildings on the river Thames. The subject of the fifth comment 205, "Houses of Parliament are really gorgeous", is to the Houses of Parliament as a whole.

The subject of a comment may be determined by semantic analysis of the comment using known semantic analysis techniques.

Figures 3, 4:
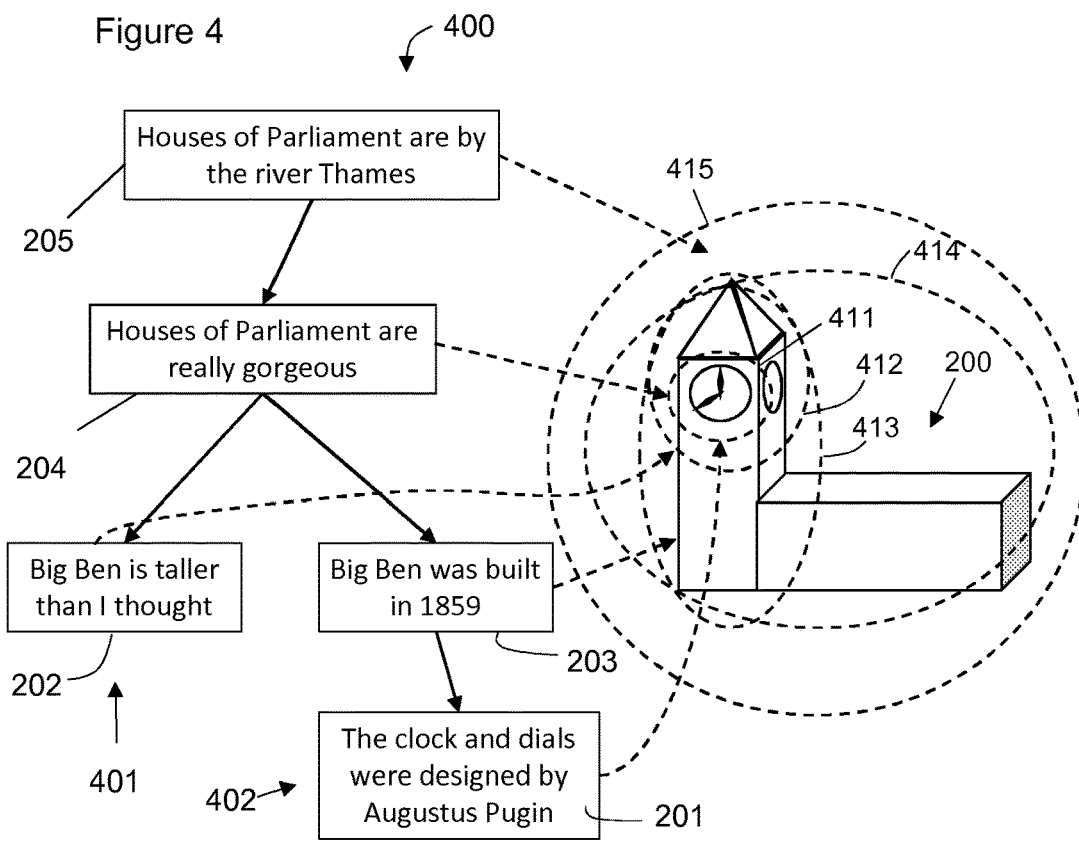
FIG. 3 illustrates a table showing data representative of the comments shown in FIG. 2.
FIG. 4 illustrates the categorization of comments and the assignment of comment-spatial-regions.

FIG. 3 shows a table 300 illustrating data representative of the comments 201-205. Each comment 201-205 includes the comment text in column 301 and a virtual location in columns 302, 303, 304 representing where the commenting-user was located in the virtual reality space when they made the comment. The virtual location, in this example, is represented using x, y, z coordinates, although other spatial reference schemes may be used. Each comment may also be associated with a unique identifier shown in column 305. The viewing direction of the commenting-user when the comment was made may also be associated with the comment in columns 306, 307, 308, shown as xd, yd, zd. Again, in this example, the viewing direction is represented using x, y, z coordinates, although other spatial reference schemes may be used.

In one or more examples, the comments 201-205 and associated location/viewing direction information may comprise the input to apparatus 100 or apparatus 106. In one or more embodiments, the determination of the point of interest may be performed by the apparatus 100 either in pre-processing or on-the-fly when providing the VR content for display to a subsequent user so that the comment(s) may be displayed to the user under the conditions described later to the user. In one or more embodiments, the determination of the point of interest may be performed by the apparatus 106 and the information representative of the comments, received by the apparatus 100, may include at least data representative of the point of interest identified by the apparatus 106.

The apparatus 100 may therefore be configured such that, based on the plurality of comments 201-205 made by one or more commenting-users, where each comment 201-205 is associated with a point of interest in the virtual reality space, the point of interest identified based on the virtual location of the commenting-user of the one or more commenting-users in the virtual reality space when the comment was made and semantic analysis of the comment to identify the point of interest surrounding the virtual location to which the comment refers; provide for display of at least a subset of the plurality of comments 201-205 overlaid over the virtual reality view of the video imagery, said subset based on the comments of the plurality of comments having points of interest that are visible in the virtual reality view provided to the user.

Accordingly, the apparatus 100 may use the data that identifies the point of interest associated with each comment and determine if the point of interest is visible in the current virtual reality view presented to the user. Accordingly, if the virtual reality view currently provided only shows the Elizabeth tower, then only comments having their point of interest as the Elizabeth tower may be included in the subset. Thus, in this example, it may be determined from the semantic analysis that the first, second and third comments 201, 202, 203 should be included in the subset but fourth and fifth comments 204, 205 should be excluded.

The semantic analysis of the text of each comment may identify keywords within the comment. In one or more examples, those keywords or part or all of the comment may be compared against predetermined point of interest data comprising a database of names of points of interest and their associated location indicative of the location in the video imagery where point of interest appears, such that one or more words in the comment determined by semantic analysis correlate with the names in the predetermined point of interest data. Thus, predetermined data that lists possible points of interest that could be referred to by commenting-users allows for identification of the point of interest using the keywords. For example, the words "Big Ben" in the second and third comments 202, 203 may be identified by semantic analysis and the location of the relevant point of interest identified. It will be appreciated that the predetermined point of interest data may include nicknames as well as official names of point of interest and/or names given to sub-parts of the same building or feature. The virtual location may be used to identify the point of interest in the predetermined point of interest data. For example, the virtual location may be used to identify candidate points of interest that are within a threshold distance of the virtual location or limit the correlation process to points of interest surrounding the virtual location. In this regard, the viewing direction 306, 307, 308 may further be used to identify the point of interest referred to in combination with the semantic analysis. Thus, a list of candidate points of interest visible from the virtual location and with the viewing direction may be identified and then semantic analysis may match the comment to one or more of those candidate point of interest. For example, the first comment makes reference to a "clock", which may be extracted by the semantic analysis. In combination with the virtual location and optionally the viewing direction, the reference to the clock may be determined to be a reference to the clock of "Big Ben", and the relevant point of interest can be associated with the comment.

In one or more examples, the semantic analysis may yield information indicative of a reference to a relative location, i.e. a location relative the commenting-users point of view. For example a comment comprising "Amazing architecture over there", may enable the point of interest, which may be expressed as a location, to be identified as a location in front of the commenting-user. Thus, a point of interest may be determined based directly from the relative location information of the comment and the virtual location and viewing direction of the commenting-user. Alternatively, for example, a comment comprising "Amazing architecture on the other side of the river", may enable the point of interest, which may be expressed as a location, to be identified as a point on the other side of the river with reference to map data in which the river may be identified.

Accordingly, the semantic analysis may yield a point of interest by way of one or more of; from determination of a relative location, identification of keywords for use in combination with predetermined point of interest data and identification of keywords for use in combination with map data.

The apparatus 100, in one or more examples, in determination of whether the point of interest is visible in the virtual reality view may use spatial data associated with the VR content to identify locations that are within the virtual reality view. In one or more examples, image recognition of objects in the virtual reality view may be performed and matched to known images of points of interest. In one or more examples, the point of interest may be defined with reference to the virtual reality space and therefore the apparatus 100 may be configured to identify a region of the virtual reality space that is visible to determine which comments have points of interest lying within the identified region. How the apparatus 100 may determine whether or not a point of interest is within the virtual reality view presented to a user, as will be appreciated, depends on the form of the information relating to the point of interest. If the point of interest is referenced by name, then a database of names of points of interest and where they appear in the virtual reality content may be used to identify those that are visible at any one time, optionally with reference to a particular virtual location and viewing direction. If the point of interest is defining in terms of a coordinate in the virtual reality space, then the apparatus 100 may be configured to determine whether the point of interest is within a region defined by the virtual reality view provided to the user, with details of the virtual reality view provided by the VR apparatus 111.

In providing for display of each of the comments of said subset, the plurality of comments may be overlaid over the virtual reality view of the video imagery. Further, each comment may be positioned in the virtual reality view such that it is associated with the point of interest to which it relates as it appears in the video imagery. Thus, in the above example, the first comment 201 relating to the clock itself may be displayed adjacent or over or hovering near the clock, while the second comment 202 relating to the tower in general may be display similarly in relation to the tower.

In one or more examples, each comment of the subset of comments may be provided for display such that they are positioned in the VR view within a predetermined distance of the position at which the point of interest is visible in the video imagery. They may be positioned not obscure the point of interest but appear associated with it. In one or more examples, the comments may be positioned to appear as if floating above the position at which the point of interest is visible in the video imagery. Accordingly, possibly with appropriate perspective effects or three-dimensional effects, the comment may appear at the appropriate depth in the video imagery to associate it with the point of interest. In one or more examples, the comments may be provided for display with a connecting-line graphic that at least points towards the position at which the point of interest is visible in the video imagery. Thus, the comment may include a lead line that terminates at the point of interest or points to it to associate the comment with the point of interest. In one or more examples, the comments may be display at any position in the virtual reality view irrespective of the position at which the imagery of the point of interest appears in the virtual reality view. In one or more examples, the comments may be provided for display scrolling across the virtual reality view. This may be advantageous as the comments may be configured to scroll out of view or otherwise removed from display after a predetermined time. The comments may be displayed as barrage or bullet comments.

For popular points of interest, there may be many comments 201-205. The display of all of the comments may be bothersome for a user trying to view the point of interest. Accordingly, the apparatus 100 may be configured to provide for determination of a subset of the comments based on more than visibility of the point of interest in the virtual reality view. For example, further factors may be considered to filter out comments from the subset or control when they are displayed to a user.

In one or more examples, said subset may be based on one or more comments of the plurality of comments having points of interest that are visible in the virtual reality view provided to the user and wherein a viewing direction of the virtual reality view provided to the user is within a viewing-direction threshold of the viewing direction associated with the comment. Accordingly, in order to be within the subset of comments provided for display, the point of interest is required to appear, at least in part, within the virtual reality view and the user must be viewing the point of interesting with a similar viewing direction to that of the commenting-user. The viewing direction of the virtual reality view may be obtained from the VR apparatus 111 (as may the field of view of the virtual reality view to determine what is visible therein). The apparatus may then be configured to filter the comments based on the viewing direction of the comment being within a threshold of the viewing direction of the virtual reality view and the point of interest being visible. The threshold may be up to 30, 25, 20, 15, 10 or 5°.

The use of the viewing direction to determine which comments are included in the subset of comments provided for display may be advantageous, particularly for points of interest that may only be visible, or viewed best from certain angles. In one or more examples, the viewing direction may be an important factor to consider when close to a point of interest as the viewing direction will affect which part of the point of interest is in view. However, further away from the object of interest, the viewing direction may be less important. Accordingly, in one or more examples, the subset may be based on the viewing direction at least when a virtual distance between the point of interest and the point of view of the virtual reality view is within a predetermined range. The predetermined range may cover virtual distances close to or far from the point of interest.

In one or more examples, said subset may be further based on a virtual distance in the virtual reality space between a point of view of the virtual reality view provided to the user and the point of interest of each of the plurality of comments irrespective of the viewing direction mentioned above. Accordingly, based on the virtual distance a predetermined proportion of comments that would form part of the subset based on one or more of the other conditions disclosed herein may be removed. In one or more other examples, the virtual distance may be used to determine which of the comments are of the subset and are displayed. Thus, for a subset of comments that are associated with a point of interest that is visible in the VR view, one or more of the comments may be removed from the subset when the virtual distance is above a threshold distance. Likewise, a different one or more comments may be removed from the subset when the virtual distance is below the threshold distance. Thus, a first proportion of the comments may be displayed when far from the point of interest and the remaining proportion displayed when close to the point of interest. Which comments to include in the subset based on the virtual distance may be based on a random selection or the specificity of the comment determined by semantic analysis. For example, the first comment 201, relating to the clock may be considered more specific than the fifth comment 205 relating to the Houses of Parliament in general. Accordingly, at virtual distances above the threshold the fifth comment 205 may form part of the subset for display. Further, while at a virtual distance below the threshold, the first comment 201 may form part of the subset for display.

Thus, in one or more examples, the virtual distance may be used to limit the number of comments provided for display despite the comments of the plurality of comments having points of interest that are visible in the virtual reality view provided to the user. In one or more examples, the comments may be categorized based on one or more of; generality of the subject matter of the comment, popularity of the comment with other users and the sentiment of the comment (such as one or more of positive, negative or neutral), and the apparatus 100 is configured to include different categories of comment in the subset based on the virtual distance.

It will be appreciated that, in this embodiment, which comments are selected and on what terms may be different, provided that there is a selection of the comments that form the subset based on the virtual distance. Further, where the virtual reality view provided to the user include several points of interest, those closer to the point of view may be associated with more comments than those further away, which may be more informative for the user without cluttering a limited display area.

In one or more examples, the resolution of the VR apparatus 111 may determine number of comments included in the subset, such that they may be displayed clearly. The VR apparatus 111 may provide details of the resolution for determination of the subset by the apparatus 100.

In one or more examples, the size of the point of interest may be important in determining which comments to display when the subset is determined based on the virtual distance. Thus, if the point of interest is a, large, city park then the comment may be included in the subset of comments when the virtual distance is above a threshold distance, because the park may be easily noticed from that distance. However, if the point of interest is a statue within the same park, the comment may be included in the subset of comments (e.g. only) when the virtual distance is below a second or the same threshold, because the statue may well be visible in the virtual reality view but may not be easily noticed from above the (second) threshold distance. Thus, the size of the point of interest may be used in combination with the virtual distance to "filter" the comments and decide which ones are part of the subset and therefore provided for display.

Accordingly, in one or more examples, said subset is further based on; a virtual distance in the virtual reality space between a point of view of the virtual reality view provided to the user and the point of interest of each of the plurality of comments and a size of the point of interest in the virtual reality space. The size of the point of interest may be determined form the data that defines the point of interest. For example, the point of interest may be defined not just by a single point but by a plurality of points defining an area, perimeter or volume occupied by or around (within a threshold) a point of interest. In one or more examples, the size of the point of interest may be determined based on one or more of predetermined map data and image recognition of the point of interest. Accordingly, the point of interest may be determined by a point or by name and with reference to map data or other predetermined information, the size of the point of interest may be derivable. In one or more embodiments, the point of interest may be defined in terms of the video imagery of the VR content and image recognition may be used to determine the size of the point of interest.

In one or more examples, said subset is further based on the time during the VR content that the comment was made, such that comments made within a temporal threshold of a current time (relative to the elapsed time from the start of the VR content, for example) are included in the subset and those outside the temporal threshold are excluded.

As described above, in one or more examples, the plurality of comments 201-205 may be categorized based on one or more of i) semantic analysis and ii) virtual location of the commenting-user when the comment was made and iii) virtual location and viewing direction of the commenting-user when the comment was made iv) time during the VR content.

In one or more examples, the use of semantic analysis may be advantageous to categorize the comments based on what it is about the point of interest they reference. Further, one point of interest may be a sub-part of a larger point of interest and semantic analysis may be used to determine whether the point of interest or a sub-part is being referred to.

Thus, in one or more examples, a first grouping or categorization may be based on virtual location and viewing direction. Such a grouping may separate the first, second and third comments 201, 202, 203 as relating to Big Ben (termed Group Big Ben) and the fourth and fifth comments 204, 205 as relating to the Houses of Parliament (termed Group Parliament).

The Group Big Ben comments may be subject to further sub-categorization based on semantic analysis. Thus, in general, a second grouping of each first grouping may be based on semantic analysis. For example, the first comment may be placed in a first, second level grouping because it relates to the clock. The second and third comments 202, 203 may be placed in a second, second level grouping because they relate to the tower in general.

Once categorized, each category may be assigned to a spatial region surrounding or associated with the point of interest, such that when the point of view of the virtual reality view is within that region, the comment forms part of the subset.

Accordingly, in one or more examples, in relation to comments of the plurality of comments that relate to the same point of interest, the apparatus 100 may provide for association of the comments with one of at least two categories based on semantic analysis of the comment. The criteria for belong to each of the categories may vary based on the comments themselves or other predetermined criteria. However, in one or more examples, a first of the at least two categories is configured to include comments that relate to the point of interest in general terms and a second of the at least two categories associated with comments that relate to one or more of; (i) a sub-region of a region occupied by the point of interest and (ii) a characteristic of a part of the point of interest. The semantic analysis may be used to assign a category to each comments.

The semantic analysis may be used to rank the comments in terms of perceived generality with a proportion of consecutively ranked comments assigned to the one category and the remaining comments assigned to one or more other categories.

The apparatus 100 may then be configured to determine the subset based on the category of the comment. For example, comments of the first category may be included in the subset temporally prior to comments of the second category while the point of interest to which they all relate is visible. In one or more examples, the virtual distance mentioned above may be used in combination with the category to determine the comments of the subset.

Thus, the apparatus 100 may be configured such that comments of the first of the at least two categories (and optionally not the second) are included in the subset when the virtual distance is above a threshold amount and comments of the second (and optionally not the first) of the at least two categories are included in the subset when the virtual distance is below the threshold amount or vice versa.

This may be advantageous as more general comments may be provided for display when the view of the point of interest in the VR view is more distant and more specific comments are displayed as the VR view moves closer to the point of interest.

FIG. 4 shows the categorization of comments as well as the assignment of a comment-spatial-range to each comment or category of comments.

In this example, the comments 201-205 are assigned to a hierarchical structure based at least on semantic analysis of the comment.

In this example, the fifth comment 205 is considered the most general and assigned to a category at the top of the tree 400. The fourth comment 204 is considered more specific and assigned to a second level in the tree 400. The first to third comments all relate to Big Ben, although the second comment 202 is determined to be opinion and the first and third comments to be facts. Accordingly, the second comment 202 is placed in a first branch 401 and the first and third comments are placed in a second branch 402. Finally, in the second branch 402, the first comment 201 is considered more specific than the third comment 203 and is placed in a third and fourth level respectively. Thus, in this example, the comments are categorized based on generality and type (fact or opinion). The criteria for categorization may differ in one or more other examples.

In this example, each comment is assigned a comment-spatial-range comprising a virtual spatial region in the virtual reality space associated with the point of interest. Accordingly, the inclusion of the comment in the subset may be based on a correlation between the location of the point of view of the virtual reality view provided to the user and the comment-spatial-range. The VR apparatus 111 may report the point of view location and the apparatus 100 (or some other apparatus in communication with the apparatus 100) may determine if the comment should form part of the subset.

The comment-spatial-range of the first comment 201 is shown as dashed line 411. The comment-spatial-range of the second comment 202 is shown as dashed line 412. The comment-spatial-range of the third comment 203 is shown as dashed line 413. The comment-spatial-range of the fourth comment 204 is shown as dashed line 414. The comment-spatial-range of the fifth comment 205 is shown as dashed line 415.

The size and/or shape of the comment-spatial-range may be based on one or more of the hierarchal position in the hierarchy 400; the generality of the comment based on semantic analysis; the virtual position and/or the viewing direction of the commenting user when the comment was made or other factors.

In one or more examples, this may be advantageous as a point of interest may be defined by the geographical area (or virtual geographical area representing the geographical area in the virtual reality space) over which it extends or in which it is visible (within a particular threshold distance) rather than a particular point. Further, when the comment is about a particular part of the point of interest, the comment-spatial-range may be sized smaller than the area of the point of interest. Further, a feature of the point of interest, mentioned in a comment, may only be visible from one side of the point of interest or from particular view points and, accordingly, the comment-spatial-range can be sized and shaped accordingly.

In the above examples various criteria for including comments in the subset for display are disclosed. It will be appreciated that when a comment does not meet or no longer meets the criteria and/or after a predetermined time, it may or may not be excluded from the subset.

In one or more examples, the apparatus 100 may be caused to semantically summarize one or more of the comments of the subset and provide the summarized comment for display. This may be advantageous for small display screen sizes or where there are many comments.

The VR content may be live content or recorded content.

FIG. 5 shows a flow diagram illustrating the steps of, based on 501 the plurality of comments made by one or more commenting-users, each comment associated with a point of interest in the virtual reality space, the point of interest identified based on a virtual location of the commenting-user of the one or more commenting-users in the virtual reality space when the comment was made and semantic analysis of the comment to identify the point of interest surrounding the virtual location to which the comment refers; provide for display 502 of at least a subset of the plurality of comments overlaid over the virtual reality view of the video imagery, said subset based at least on the comments of the plurality of comments having points of interest that are visible in the virtual reality view provided to the user.

FIG. 6 illustrates schematically a computer/processor readable medium 600 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method, the method comprising:
    in respect of virtual reality content captured by a virtual reality content capture device and comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;
    based on the plurality of comments made by one or more commenting-users, each comment associated with a point of interest in the virtual reality space, the point of interest identified based on a virtual location of the commenting-user of the one or more commenting-users in the virtual reality space when the comment was made and also based on semantic analysis of the comment including analysis of text of the comment to identify one or more of a keyword or a reference to a location from which to identify the point of interest surrounding the virtual location to which the comment refers;
    based on the plurality of comments made by one or more commenting-users, each comment is further associated with a viewing direction comprising the viewing direction of the commenting-user in the virtual reality space when they made the comment; and
    providing for display by a virtual reality apparatus of at least a subset of the plurality of comments overlaid over the virtual reality view of the video imagery, said subset based at least on the comments of the plurality of comments having points of interest that are visible in the virtual reality view provided to the user and a viewing direction of the virtual reality view provided to the user is within a viewing-direction threshold of the viewing direction associated with the comment,
    wherein said subset is further based on:
    a virtual distance in the virtual reality space between a point of view of the virtual reality view provided to the user and the point of interest of each of the plurality of comments and
    a size of the point of interest in the virtual reality space.

2. A method according to claim 1, wherein each of the comments of said subset of the plurality of comments overlaid over the virtual reality view of the video imagery are positioned in the virtual reality view such that they are associated with the point of interest to which they relate as it appears in the video imagery.

3. A method according to claim 1, wherein the analysis of the text of the comment is capable of identifying the point of interest is identified based on one or more of:
    i) reference to predetermined point of interest data comprising a database of names of points of interest and their associated location indicative of the location in the video imagery where a point of interest appears, such that one or more words in the comment determined by semantic analysis correlate with the names in the predetermined point of interest data; and
    ii) reference to a location that is expressed by one or more words in the comment as relative to the virtual location of the commenting-user.

4. A computer readable medium comprising a hardware component having computer program code stored thereon, the computer readable medium and computer program code being configured to, when run on at least one processor, perform the method of claim 1.

5. A method according to claim 1, wherein the comments of the plurality of comments that relate to the same point of interest are each associated with one of at least two categories based on semantic analysis of the comment, a first of the at least two categories associated with comments that relate to the point of interest in general terms and a second of the at least two categories associated with comments that relate to one or more of; (i) a sub-region of a region occupied by the point of interest and (ii) a characteristic of a part of the point of interest, and wherein;
    the subset of comments is further based on the category.

6. A method according to claim 5, wherein said subset is further based on a virtual distance in the virtual reality space between a point of view of the virtual reality view provided to the user and the point of interest of each of the plurality of comments wherein
    comments of the first of the at least two categories and not the second are included in the subset when the virtual distance is above a threshold amount and comments of the second of the at least two categories are included in the subset when the virtual distance is below the threshold amount.

7. A method according to claim 1, wherein each comment is associated with a comment-spatial-range, the comment-spatial-range defining a virtual spatial region in the virtual reality space associated with the point of interest, and wherein one or more of the size and shape of the comment-spatial-range is based on semantic analysis of the comment, and wherein the inclusion in the subset of each comment of the plurality of comments is further based on a correlation between the location of the point of view of the virtual reality view provided to the user and the comment-spatial-range.

8. A method according to claim 7, wherein the comment-spatial-range defines an area in the virtual reality space from which a feature of the point of interest mentioned in the comment is visible and within a particular threshold distance.

9. A method, the method comprising:

in respect of virtual reality content captured by a virtual reality content capture device and comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on the plurality of comments made by one or more commenting-users, each comment associated with a point of interest in the virtual reality space, the point of interest identified based on a virtual location of the commenting-user of the one or more commenting-users in the virtual reality space when the comment was made and also based on semantic analysis of the comment including analysis of text of the comment to identify one or more of a keyword or a reference to a location from which to identify the point of interest surrounding the virtual location to which the comment refers;

based on the plurality of comments made by one or more commenting-users, each comment is further associated with a viewing direction comprising the viewing direction of the commenting-user in the virtual reality space when they made the comment; and providing for display by a virtual reality apparatus of at least a subset of the plurality of comments overlaid over the virtual reality view of the video imagery, said subset based at least on the comments of the plurality of comments having points of interest that are visible in the virtual reality view provided to the user and a viewing direction of the virtual reality view provided to the user is within a viewing-direction threshold of the viewing direction associated with the comment, wherein the comments of the plurality of comments that relate to the same point of interest are each associated with one of at least two categories based on semantic analysis of the comment, a first of the at least two categories associated with comments that relate to the point of interest in general terms and a second of the at least two categories associated with comments that relate to one or more of; (i) a sub-region of a region occupied by the point of interest and (ii) a characteristic of a part of the point of interest, and wherein;

the subset of comments is further based on the category.

10. A computer readable medium comprising a hardware component having computer program code stored thereon, the computer readable medium and computer program code being configured to, when run on at least one processor, perform the method of claim 9.

11. A method according to claim 9, wherein said subset is further based on a virtual distance in the virtual reality space between a point of view of the virtual reality view provided to the user and the point of interest of each of the plurality of comments.

12. A method according to claim 9, wherein said subset is further based on;

a virtual distance in the virtual reality space between a point of view of the virtual reality view provided to the user and the point of interest of each of the plurality of comments and a size of the point of interest in the virtual reality space.

13. A method according to claim 9, wherein said subset is further based on a virtual distance in the virtual reality space between a point of view of the virtual reality view provided to the user and the point of interest of each of the plurality of comments wherein comments of the first of the at least two categories and not the second are included in the subset when the virtual distance is above a threshold amount and comments of the second of the at least two categories are included in the subset when the virtual distance is below the threshold amount.

14. A method according to claim 9, wherein each of the comments of said subset of the plurality of comments overlaid over the virtual reality view of the video imagery are positioned in the virtual reality view such that they are associated with the point of interest to which they relate as it appears in the video imagery.

15. A method according to claim 9, wherein the analysis of the text of the comment is capable of identifying the point of interest is identified based on one or more of:

i) reference to predetermined point of interest data comprising a database of names of points of interest and their associated location indicative of the location in the video imagery where a point of interest appears, such that one or more words in the comment determined by semantic analysis correlate with the names in the predetermined point of interest data; and ii) reference to a location that is expressed by one or more words in the comment as relative to the virtual location of the commenting-user.

16. A method, the method comprising:

in respect of virtual reality content captured by a virtual reality content capture device and comprising video imagery configured to provide a virtual reality space for viewing in virtual reality, wherein a virtual reality view presented to a user provides for viewing of the virtual reality space, the virtual reality view comprising a spatial portion of the video imagery that forms the virtual reality space and being smaller in spatial extent than the spatial extent of the video imagery of the virtual reality space;

based on the plurality of comments made by one or more commenting-users, each comment associated with a point of interest in the virtual reality space, the point of interest identified based on a virtual location of the commenting-user of the one or more commenting-users in the virtual reality space when the comment was made and also based on semantic analysis of the comment including analysis of text of the comment to identify one or more of a keyword or a reference to a location from which to identify the point of interest surrounding the virtual location to which the comment refers;

based on the plurality of comments made by one or more commenting-users, each comment is further associated with a viewing direction comprising the viewing direction of the commenting-user in the virtual reality space when they made the comment; and providing for display by a virtual reality apparatus of at least a subset of the plurality of comments overlaid over the virtual reality view of the video imagery, said subset based at least on the comments of the plurality of comments having points of interest that are visible in the virtual reality view provided to the user and a viewing direction of the virtual reality view provided to the user is within a viewing-direction threshold of the viewing direction associated with the comment, wherein each comment is associated with a comment-spatial-range, the comment-spatial-range defining a virtual spatial region in the virtual reality space associated with the point of interest, and wherein one or more of the size and shape of the comment-spatial-range is based on semantic analysis of the comment, and wherein the inclusion in the subset of each comment of the plurality of comments is based on a correlation between the location of the point of view of the virtual reality view provided to the user and the comment-spatial-range.

17. A method according to claim 16, wherein the comment-spatial-range defines an area in the virtual reality space from which a feature of the point of interest mentioned in the comment is visible and within a particular threshold distance.

18. A computer readable medium comprising a hardware component having computer program code stored thereon, the computer readable medium and computer program code being configured to, when run on at least one processor, perform the method of claim 16.

19. A method according to claim 16, wherein said subset is further based on a virtual distance in the virtual reality space between a point of view of the virtual reality view provided to the user and the point of interest of each of the plurality of comments.

20. A method according to claim 16, wherein said subset is further based on;
   a virtual distance in the virtual reality space between a point of view of the virtual reality view provided to the user and the point of interest of each of the plurality of comments and
   a size of the point of interest in the virtual reality space.

* * * * *